United States Patent
Prakash et al.

(10) Patent No.: US 10,870,781 B2
(45) Date of Patent: Dec. 22, 2020

(54) COMPOSITIONS AND METHODS FOR PROBING ADHESIVE INTERFACES

(71) Applicant: The Boeing Company, Chicago, IL (US)

(72) Inventors: Om Prakash, Bangalore (IN); Megha Sahu, Bangalore (IN)

(73) Assignee: The Boeing Company, Chicago, IL (US)

( * ) Notice: Subject to any disclaimer, the term of this patent is extended or adjusted under 35 U.S.C. 154(b) by 239 days.

(21) Appl. No.: 15/942,245

(22) Filed: Mar. 30, 2018

(65) Prior Publication Data

US 2019/0300759 A1     Oct. 3, 2019

(51) Int. Cl.
| | |
|---|---|
| *B32B 41/00* | (2006.01) |
| *C09J 9/00* | (2006.01) |
| *G06T 7/00* | (2017.01) |
| *C09J 5/06* | (2006.01) |
| *C09J 11/06* | (2006.01) |

(52) U.S. Cl.
CPC . *C09J 9/00* (2013.01); *C09J 5/06* (2013.01); *C09J 11/06* (2013.01); *G06T 7/001* (2013.01); *C09J 2463/00* (2013.01); *G06T 2207/30108* (2013.01); *G06T 2207/30208* (2013.01)

(58) Field of Classification Search
CPC ....... C09J 9/00; C09J 11/06; C09J 5/06; C09J 2463/00; G06T 7/001; G06T 2207/30108; G06T 2207/30208
USPC ................... 156/60, 64, 350, 351, 378, 379
See application file for complete search history.

(56) References Cited

U.S. PATENT DOCUMENTS

| | | |
|---|---|---|
| 3,040,164 A | 6/1962 | Pevar |
| 4,944,185 A | 7/1990 | Clark, Jr. et al. |
| 5,833,795 A | 11/1998 | Smith et al. |
| 6,849,195 B2 | 2/2005 | Basheer et al. |
| 8,343,298 B2 | 1/2013 | Rawlings et al. |

(Continued)

FOREIGN PATENT DOCUMENTS

WO     WO-0034404 A1 *  6/2000  .............. C09J 17/02

OTHER PUBLICATIONS

Everitt, Geoege Frederick, "Transition—Metal Complexes of Tetracyanoethylene", LSU Historical Dissertations and Theses, 1971, pp. 1-136.

*Primary Examiner* — Michael N Orlando
*Assistant Examiner* — Joshel Rivera
(74) *Attorney, Agent, or Firm* — Kolisch Hartwell, P.C.

(57) ABSTRACT

Systems and methods for monitoring the health of an adhesive interface include the formation of an adhesive bond using an adhesive system incorporating molecular-scale magnetic markers covalently attached to polymer components, acquisition of images representing the distribution of magnetic markers within the adhesive bond at a first time and at a later time, and comparison of the images to detect displacement of the magnetic markers between the first time and the later time. The covalent link between the magnetic markers and the adhesive polymer components locks the magnetic markers in place as long as the adhesive bond remains healthy, so displacement of the magnetic markers between the first time and the later time indicates the presence of a bond defect. The images may be acquired using magnetic particle imaging and compared using digital image correlation. Chemical compositions for the magnetic markers are disclosed.

20 Claims, 5 Drawing Sheets

(56) References Cited

U.S. PATENT DOCUMENTS

| | | |
|---|---|---|
| 8,378,668 B2 | 2/2013 | Faidi et al. |
| 2010/0134098 A1* | 6/2010 | Faidi ........................ H01F 1/37 |
| | | 324/238 |

* cited by examiner

COMPOSITIONS AND METHODS FOR PROBING ADHESIVE INTERFACES

FIELD

This disclosure relates to systems and methods for adhesives. More specifically, the disclosed examples relate to compositions and methods for monitoring changes in adhesive bonds.

INTRODUCTION

Adhesive bonding is a promising alternative to rivets and other mechanical fasteners for joining parts together during manufacture or repair of large structures such as aircraft. Components joined by an adhesive bond experience more uniform stress than components joined by mechanical fasteners. Additionally, an adhesive bond adds less weight to the structure than mechanical fasteners do. However, monitoring the integrity of an adhesive bond poses a challenge. Existing techniques for structural health monitoring of adhesively bonded structures suffer from various drawbacks. For example, some techniques compromise the health of the bond by straining it or embedding macroscopic objects within it. Other techniques require impractical amounts of time or expertise. A method for adhesive bond inspection that overcomes these obstacles would be highly advantageous. Such a method would especially benefit the aerospace industry, where the low weight of adhesive bonds is highly valued, but the need to routinely and reliably monitor the health of the bond is paramount.

SUMMARY

The present disclosure provides systems, apparatuses, compositions, and methods relating to probing adhesive bonds. In some embodiments, a method for joining parts may include covalently linking a magnetic marker to an adhesive polymer component, applying the adhesive polymer component to an interface space between a first surface and a second surface, and curing the adhesive polymer component to form a cured adhesive bond between the first and second surfaces.

In some embodiments, a method of monitoring a characteristic of an adhesive bond over time may include creating an adhesive bond between two structures, acquiring a first digital image of the adhesive bond using magnetic particle imaging at a first time point, acquiring a second digital image of the adhesive bond using magnetic particle imaging at a second time point, and comparing the second digital image to the first digital image.

In some embodiments, an adhesive system may include an epoxy resin comprising polymers having epoxide groups, and a curing agent formulated for combining with the resin, and causing crosslinking between polymers in the resin, and a magnetic marker configured for covalent attachment to the polymer.

Features, functions, and advantages may be achieved independently in various embodiments of the present disclosure, or may be combined in yet other embodiments, further details of which can be seen with reference to the following description and drawings.

DESCRIPTION

Various aspects and examples of systems for probing adhesive interfaces, as well as related methods, are described below and illustrated in the associated drawings. Unless otherwise specified, a system for probing adhesive interfaces and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Overview

In general, systems and methods of the present disclosure are directed to adhesive systems including magnetic markers. An illustrative adhesive system 35, depicted in FIG. 1, includes an adhesive polymer component 45, a curing agent 48 configured to facilitate crosslinking between adhesive polymer components, and a magnetic marker 50. Adhesive polymer component 45 may be an epoxy resin. Magnetic marker 50 includes a magnetic component 51 and a chemical component 52 configured to covalently attach to adhesive polymer component 45.

Figure 2:
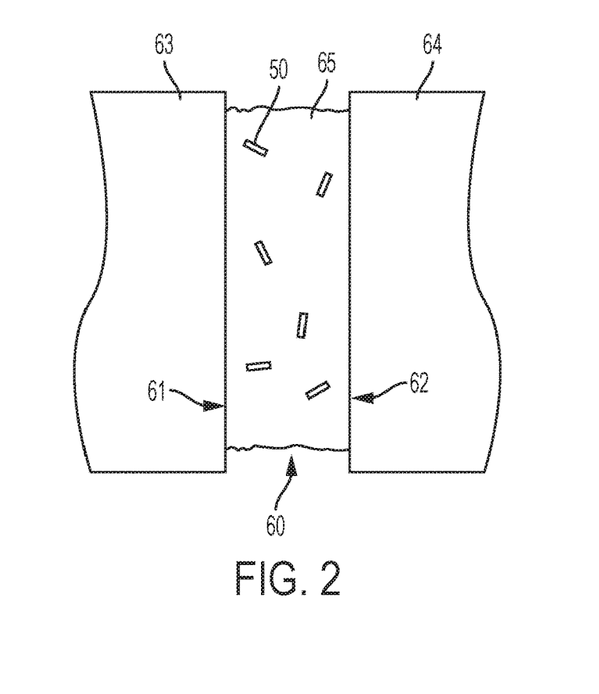
FIG. 2 is a side view of an illustrative adhesive bond formed between two structures by an adhesive product including the adhesive system of FIG. 1.

Adhesive system 35 may be included in an adhesive product applied to interface space 60 between surfaces 61 and 62 of structures 63 and 64 to form an adhesive bond 65 between the two structures (see FIG. 2). Accordingly, adhesive bond 65 includes a plurality of magnetic markers 50, which are typically distributed randomly throughout interface space 60. Magnetic markers 50 are sufficiently small in size (e.g., molecular-scale in length) that they do not compromise the health of adhesive bond 65. After the adhesive product of adhesive bond 65 has been cured, magnetic markers 50 are locked in place within interface space 60 by the covalent connection between the magnetic markers and crosslinked adhesive polymer components 45.

The orientation and position of each magnetic marker 50 in cured adhesive bond 65 remains fixed unless a defect arises in the bond. However, defects in adhesive bond 65 and structural failures in the bonded parts typically displace and/or rotate at least one magnetic marker 50 from its original position relative to other markers or indicia. The health of adhesive bond 65 may therefore be inspected by identifying the current positions of magnetic markers 50 and comparing the current positions to reference positions obtained when the bond was originally created, or when it was known to be healthy.

Current positions and reference positions of magnetic markers 50 within adhesive bond 65 may be identified based on the magnetic fields produced by the magnetic markers using techniques such as nuclear magnetic resonance imaging or magnetic particle imaging. Information about the positions of magnetic markers 50 at a given point in time may take the form of an image or 3D distribution of the spatial positions and orientations of the entire ensemble of magnetic markers within adhesive bond 65. The current distribution may be compared to the reference distribution using digital image correlation or another suitable technique to identify any changes in the positions and/or orientations of one or more magnetic markers 50.

In some examples, adhesive system 35 is used to create adhesive bond 65 between components of an aircraft during manufacture or repair of the aircraft. Adhesive bond 65 may also join a repair part, such as a metal patch, to an aircraft. The integrity of the repair may therefore be monitored by checking for changes in the positions and/or orientations of magnetic markers 50. In other examples, adhesive system 35 is used in a coating (e.g., an epoxy coating), or in the matrix of a composite material (i.e., adhesive system 35 may be applied to an interlaminar interface within a composite laminate). Monitoring the positions and/or orientations of magnetic markers 50 within a coating may detect damage or degradation in the coating or separation between the coating and the surface to which it is applied. Monitoring the positions and/or orientations of magnetic markers 50 within a composite material may detect delamination or other defects within the composite.

EXAMPLES, COMPONENTS, AND ALTERNATIVES

The following sections describe selected aspects of exemplary systems and methods for probing adhesive interfaces. The examples in these sections are intended for illustration and should not be interpreted as limiting the entire scope of the present disclosure. Each section may include one or more distinct embodiments or examples, and/or contextual or related information, function, and/or structure.

A. Illustrative Adhesive System

Figure 1:
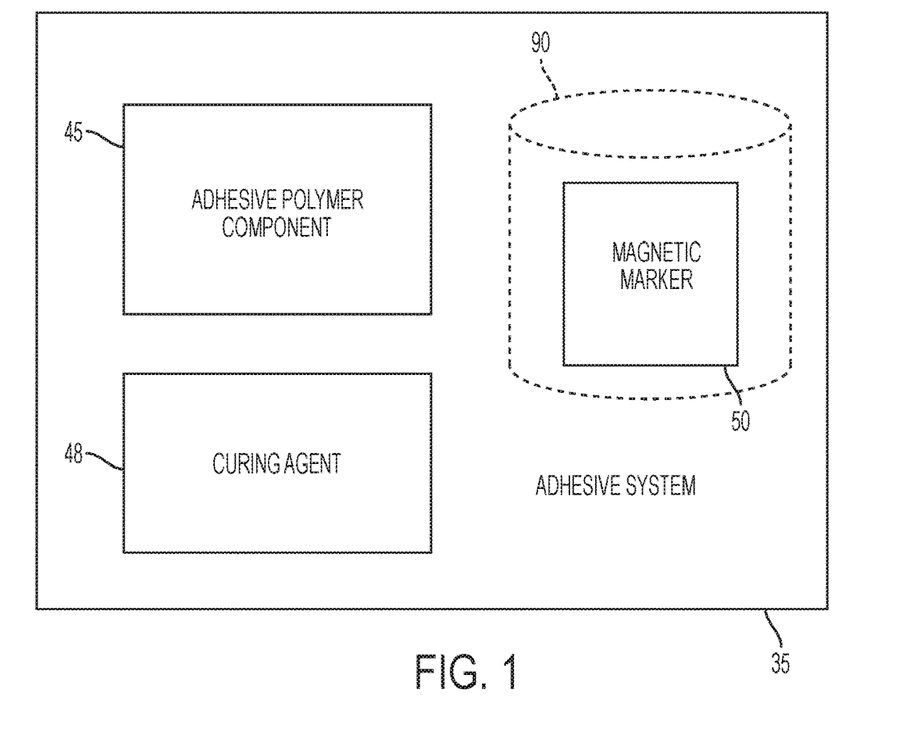
FIG. 1 is a schematic diagram of an illustrative adhesive system including a magnetic marker, in accordance with aspects of the present teachings.
Figure 3:
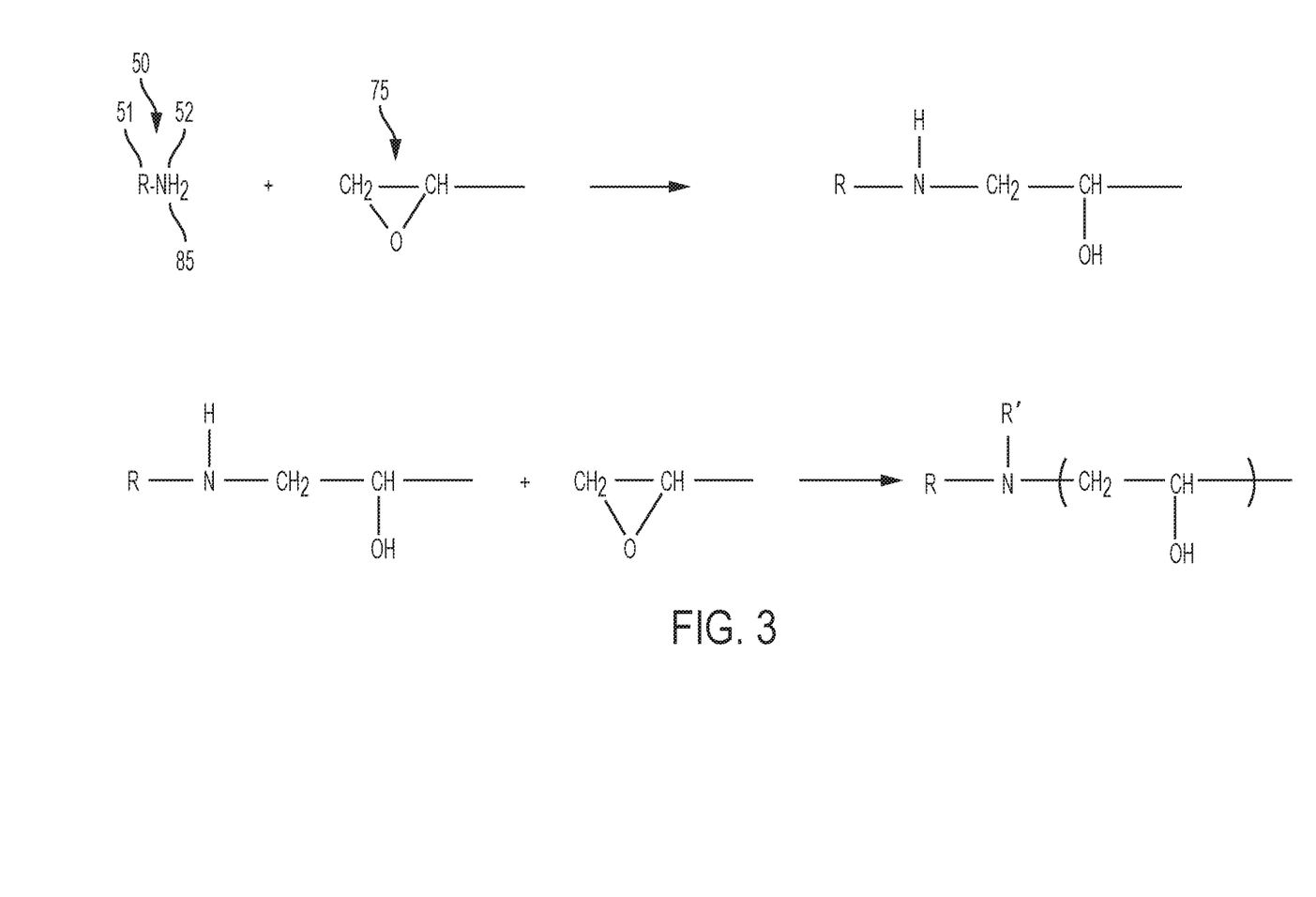
FIG. 3 is a diagram of an illustrative chemical reaction between components of the adhesive system of FIG. 1.

As shown in FIGS. 1-3, this section describes an illustrative adhesive system 35, which may be included in an adhesive product used to form an adhesive bond 65.

Adhesive system 35 includes an adhesive polymer component 45. Adhesive polymer component 45 may be an epoxy resin, a polyurethane resin, a silicone resin, a methyl methacrylate resin, or any other polymer component configured to cross-link to form a hardened adhesive bond 65. The cross-linking process may be referred to as polymerization. Adhesive system 35 also includes a curing agent 48 configured to facilitate the cross-linking of adhesive polymer component 45. Curing agent 48 may include amines, anhydrides, or any other component configured to facilitate curing and/or polymerization of adhesive polymer component 45.

In one example, adhesive polymer component 45 is an epoxy resin comprising polymers having epoxide groups 75, and curing agent 48 comprises a curing group, which may be an amine group, an anhydride group, or the like. The cross-linking process includes a ring-opening reaction of epoxide group 75 with the curing group. The cross-linking process may further include etherification between epoxide groups 75 that have been reacted (i.e., opened via a ring-opening mechanism) and epoxide groups that are unreacted. In other examples, curing agent 48 is omitted, and cross-linking of adhesive polymer component 45 is facilitated by heat, ultraviolet light, or other conditions.

Adhesive system 35 further includes magnetic marker 50. Magnetic marker 50 includes chemical component 52 configured to attach covalently to adhesive polymer component 45, such that the position and orientation of the magnetic marker in the cured adhesive bond 65 is fixed. In one example, chemical component 52 is an attaching group 85 configured to connect covalently to adhesive polymer component 45. Attaching group 85 may be, for example, an amine group or an anhydride group. Attaching group 85 may react with adhesive polymer component 45 via a ring-opening mechanism (for example, a ring-opening mechanism of epoxide group 75), such that the attaching group forms part of the cross-linked polymer network of cured adhesive bond 65. An illustrative reaction between magnetic marker 50 including attaching group 85 and adhesive polymer component 45 is depicted in FIG. 3. In this example, adhesive polymer component 45 is an epoxide group 75 that undergoes a ring-opening reaction when combined with attaching group 85 of magnetic marker 50, enabling it to cross-link with other adhesive polymer components to form a cross-linked polymer network.

Magnetic component 51 of magnetic marker 50 is configured to produce a magnetic field measurable by, e.g., a magnetic particle imaging apparatus adjacent adhesive bond 65. Magnetic component 51 may include a particle, such as an aggregate, a nanocluster, nanoparticle, or microparticle. Magnetic component 51 may be magnetic, and may be superparamagnetic. Magnetic component 51 may be a charge-transfer salt; a material comprising a plurality of charge-transfer complexes, where the members of the charge-transfer complexes have undergone an electron-transfer to form ions of opposing charge.

The charge-transfer salt may incorporate charge-transfer complexes that are inorganic, organic, or organometallic. Any charge-transfer complex that can form a cluster that exhibits suitable magnetic properties for use as a magnetic marker according to the present disclosure is a suitable charge-transfer complex.

Magnetic component 51 and/or magnetic marker 50 may be created via precipitation from solution, coprecipitation, microemulsions, high-temperature decomposition of organic precursors, spray pyrolysis, laser pyrolysis, or any other suitable method of synthesis.

In some examples, magnetic component 51 includes iron oxide. Illustrative compositions suitable for forming magnetic component 51, or another component of magnetic marker 50, may include charge-transfer salts with a plurality of organometallic charge-transfer complexes having the formula $M(TCNE)_x$ where M is a metal center selected from the group consisting of Fe, Co, Ni, a Mn(porphyrin) complex, and $[Fe(C_5Me_5)_2]$ (also known as $Cp*_2Fe$). The compound TCNE, or tetracyanoethylene, acts as a partner for the charge transfer that occurs between the metal center and the TCNE molecule. The subscript x may be any integer necessary to balance out the net charges of the components of the complexes, and is typically 1-4. Such organometallic charge-transfer salts may be used to form single chain magnets.

Alternatively, magnetic component 51 is or includes a charge-transfer salt that is a spinel ferrite having the formula $J[Fe_2O_4]$, where J is a metal selected from the group consisting of Cu, Ni, Mn, and Mg. In these spinels the $O_2^-$ ions may be arranged in a cubic close-packed lattice, while the $J^{2+}$ and $Fe^{3+}$ ions may be arranged within the tetrahedral and octahedral voids in the lattice. These spinel ferrites may be synthesized using coprecipitation methods. For example, the cuprospinel $Cu[Fe_2O_4]$ may be synthesized using $CuCl_2$ and $FeCl_3$ in a basic environment (for example using NaOH).

In some examples, adhesive system 35 is created by combining magnetic marker 50 and adhesive polymer component 45, and then adding curing agent 48 to the combined magnetic marker and adhesive polymer component. For example, adhesive polymer component 45 may comprise an epoxy resin, and magnetic marker 50 may be added to the resin prior to combining the resin with curing agent 48. In other examples, magnetic marker 50 is combined with curing agent 48, and then the combined magnetic marker and curing agent are added to adhesive polymer component 45. In other examples, magnetic marker 50 is provided in a separate container 90 and is formulated to be combined with adhesive polymer component 45 and curing agent 48 at the same time. In some examples, a small quantity of adhesive product comprising adhesive system 35 is mixed with a larger quantity of unmodified adhesive product. The unmodified adhesive product includes adhesive polymer component 45 and curing agent 48, but does not include magnetic marker 50 until adhesive system 35 is mixed with the unmodified adhesive. The mixing of adhesive system 35 into the unmodified adhesive product results in an adhesive product including a random distribution and random orientation of magnetic markers 50.

Adhesive polymer component 45 and curing agent 48 typically are thoroughly mixed together to facilitate the chemical reactions that cure adhesive bond 65. As a consequence of the mixing process, magnetic markers 50 typically are distributed at random throughout adhesive bond 65; i.e., the positions and orientations of the magnetic markers are random.

The size of magnetic marker 50 is molecular-scale; for example, the magnetic marker may have dimensions of hundreds of nanometers, or several nanometers, or less than a nanometer. Due to their small size, magnetic markers 50 do not reduce the strength of adhesive bond 65; i.e., they do not interfere with adhesion between adhesive system 35 and surfaces 61 and 62, or with cohesion within the adhesive bond, as a macroscopic particle or powder might.

B. Illustrative Adhesive Bond Probing System

Magnetic component 51 of magnetic markers 50 produces a magnetic field. An adhesive bond probing system 150 configured to measure magnetic fields in and/or near adhesive bond 65 can therefore be used to detect magnetic markers 50 and identify the positions of the markers within the bond.

In one example, adhesive bond probing system 150 includes a mobile device 160 configured to identify the positions of magnetic markers 50 within adhesive bond 65. In some embodiments, mobile device 160 uses aspects of magnetic particle imaging to identify positions of magnetic markers 50; magnetic particle imaging techniques may have a greater sensitivity and/or resolution than other magnetic imaging methods, allowing adhesive bond 65 to be probed using a relatively low concentration of magnetic markers (e.g., approximately 1 mg/kg).

An illustrative mobile device 160 performing aspects of magnetic particle imaging may include electromagnets configured to apply a magnetic drive field and a magnetic selection field. The drive field may be a sinusoidal magnetic field configured to induce a change of magnetization in magnetic markers 50, and the selection field may be a static magnetic field with a spatial gradient configured to saturate the magnetization of the magnetic markers outside of a selected region in space (i.e., a field free region or field free point). The induced change in the magnetization of magnetic markers 50 within the field free region may be detected as an induced voltage in a receive coil or other device configured to measure magnetic flux density. The induced voltage indicates the presence of magnetic markers 50 in the field free region, and may be used to infer the concentration of markers within the field free region. The selection field and the drive field may be adjusted to scan the field free region across adhesive bond 65 (i.e., across interface space 60) such that the entire bond is probed for magnetic markers 50. Mobile device 160 may further include controllers configured to produce the desired drive field and selection field, as well as filters, analog-to-digital converters, and other electronic components configured to receive, process, and/or generate signals. Mobile device 160 may be configured to adjust and apply the drive field and selection field fully automatically or partially automatically, and may be configured to measure induced voltage in a receive coil fully automatically or partially automatically.

Mobile device 160 may be configured to store a record of data associated with the positions of magnetic markers 50 within adhesive bond 65. For example, mobile device 160 may record the induced voltage in a receive coil corresponding to each spatial location probed by the field free region. Mobile device 160 may be configured to formulate or express the recorded data as a digital image 165 of adhesive bond 65 based on the distribution of magnetic markers 50 within the adhesive bond. In some examples, mobile device 160 is configured to transmit the recorded data to another device (e.g., a processor or computer) which formulates the data as digital image 165 of adhesive bond 65.

As discussed above, magnetic markers 50 are locked in place in the cross-linked network of polymers forming cured adhesive bond 65 due to the covalent link between the magnetic markers and adhesive polymer component 45. The positions (including spatial orientations) of magnetic markers 50 do not change as long as the adhesive bond remains healthy. When the bond begins to fail, at least one of the magnetic markers 50 is typically displaced from its original position. For example, a crack in adhesive bond 65 (i.e., a cohesive defect) may displace one or more magnetic markers 50. An adhesive defect or a structural defect may shift the stress and/or strain on adhesive bond 65 such that one or more magnetic markers 50 are displaced or rotated. A change in the position of at least one magnetic marker 50 therefore indicates the presence of a defect in adhesive bond 65 and/or the structures joined by the adhesive bond. The health of adhesive bond 65 can therefore be probed by checking for changes in the positions of magnetic markers 50 within the adhesive bond.

For example, magnetic particle imaging may be used (e.g., via mobile device 160) to obtain a first image 170 of adhesive bond 65 at a time when the adhesive bond is known to be healthy. At a later second time, the health of adhesive bond 65 may be probed by using magnetic particle imaging to obtain a second image 175 of the adhesive bond. Second image 175 is compared with first image 170 to identify any changes in position (including orientation) of any magnetic markers 50 between the first time and the later time.

Figure 4:
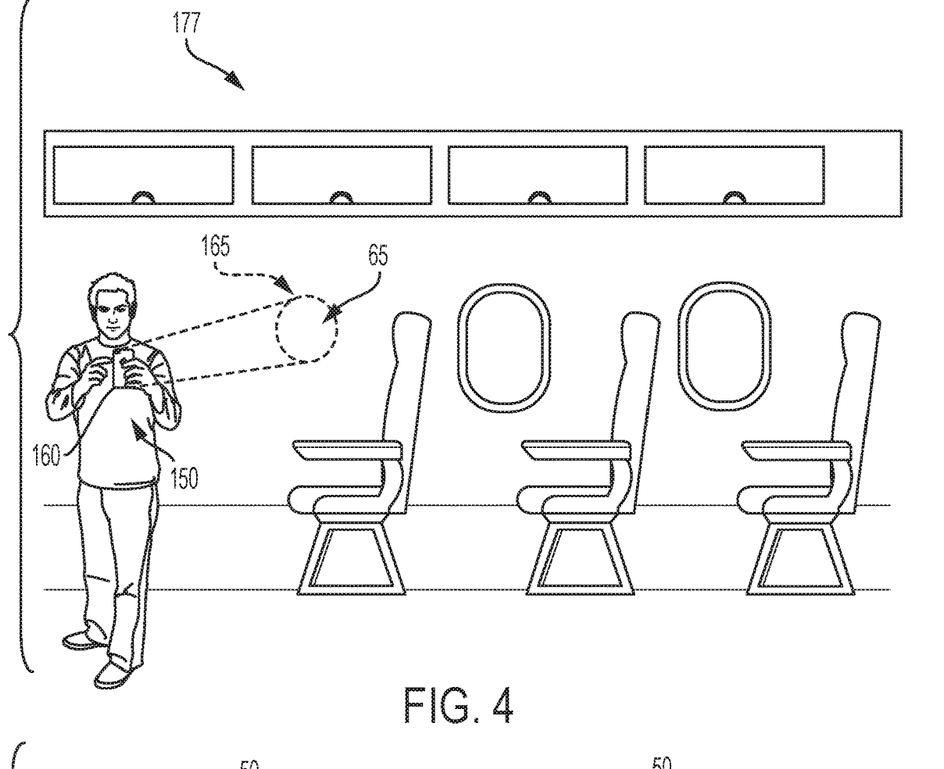
FIG. 4 is a schematic side view of the interior of an illustrative aircraft including an adhesive bond being inspected in accordance with aspects of the present teachings.

FIG. 4 depicts an illustrative mobile device 160 being used to inspect adhesive bond 65 in an illustrative aircraft 177. Mobile device 160 is configured to be easily moved throughout aircraft 177 to inspect adhesive bonds in any portion of the aircraft, including portions that could not easily be reached by a larger, more unwieldy apparatus. Mobile device 160 may be a handheld device, as depicted in FIG. 4, or may be configured to be transported on a cart or other apparatus. Mobile device 160 may include one or more computers, tablets, smartphones, processors, and/or microcontrollers configured to perform aspects of magnetic particle imaging. Inspecting adhesive bond 65 in aircraft 177 may include using mobile device 160 to acquire a digital image 165 of the adhesive bond; that digital image may be used as a second image 175 to compare to a previously-acquired first image 170 to identify possible bond defects.

Figure 5:
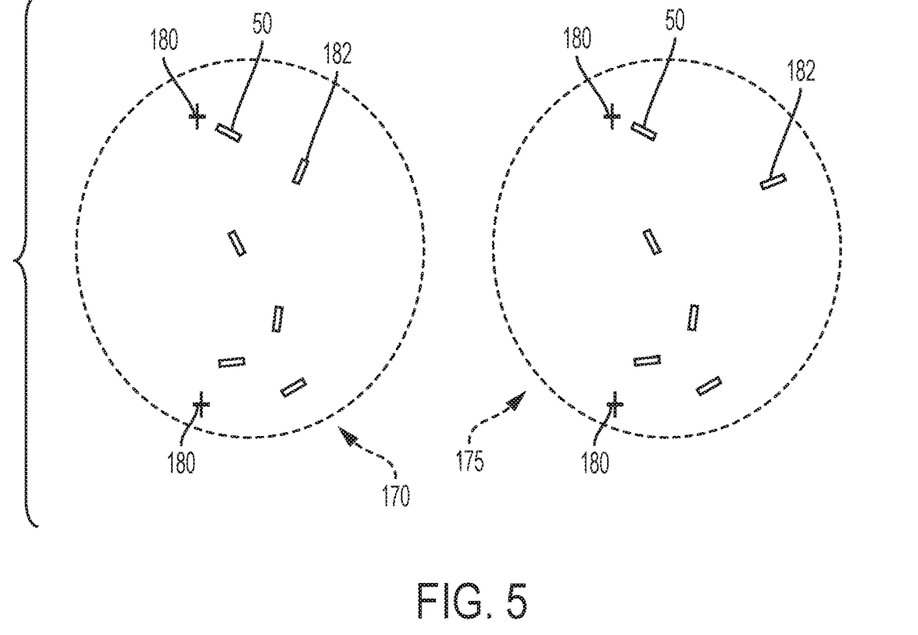
FIG. 5 is a schematic diagram of illustrative images of an adhesive bond probed according to aspects of the present teachings.

Identifying changes in positions of magnetic markers 50 between first image 170 and second image 175 may require ensuring that the two images are oriented at a same position or reference frame relative to adhesive bond 65. Location-specific indicia 180 are reference points included in or adjacent adhesive bond 65, bonded surfaces 61 and 62, and/or other portions of bonded structures 63 and 64 to facilitate same orientation of the images for acquiring or processing the images. For example, first and second images 170 and 175 may be rotated in three dimensions until indicia 180 have a same position and/or orientation in both images. Indicia 180 may be, e.g., magnetic objects with a distinctive shape. In some examples, groups of magnetic markers 50 serve as indicia 180 for orienting first and second images 170 and 175. The random distribution and orientation of magnetic markers 50 within adhesive bond 65 may result in subsets of magnetic markers in the bond that are disposed in a readily identifiable pattern that can be used to orient first and second images 170 and 175 at a same orientation. If first image 170 and second image 175 are not oriented at a same angular position, comparison of the two images may fail to show that magnetic markers 50 have changed position, or may incorrectly suggest that some markers that actually have not changed position have done so.

FIG. 5 depicts illustrative first image 170 and second image 175 including indicia 180 and a plurality of magnetic markers 50. Illustrative first and second images 170 and 175 may have been produced by mobile device 160 inspecting adhesive bond 65 in aircraft 177, as depicted in FIG. 4. Displaced magnetic marker 182 is in a different position in second image 175 than in first image 170, relative to the other magnetic markers 50 and indicia 180. The change in position of displaced magnetic marker 182 indicates the presence of a defect in adhesive bond 65.

The comparison between second image 175 and first image 170 may be performed using any method, technique, and/or technology configured to identify differences between two images or two sets of data. In one example, second image 175 and first image 170 are compared using digital image correlation. Digital image correlation, which may include digital volume correlation, is performed by digital image correlation software using first image 170 and second image 175 as inputs. The digital image correlation software may be implemented on a personal computer and/or any other suitable processing system. The digital image correlation software is configured to identify portions of second image 175 corresponding to portions of first image 170 and to determine whether the objects depicted in the identified portions have changed position (relative to indicia 180 or other reference points) between the first and second images. A change in the location of any portion of adhesive bond 65 between first image 170 and second image 175 indicates a defect in the adhesive bond and/or structural failure in parts joined by the bond.

The digital image correlation software may further be configured to identify the physical mechanism that could have caused the displacement of portions of adhesive bond 65 between first and second images 170 and 175. Information about the physical mechanism responsible for the displacement may be used to infer a characteristic of adhesive bond 65, such as a location, type, or severity of a defect.

C. Illustrative Method for Joining Parts

Figure 6:
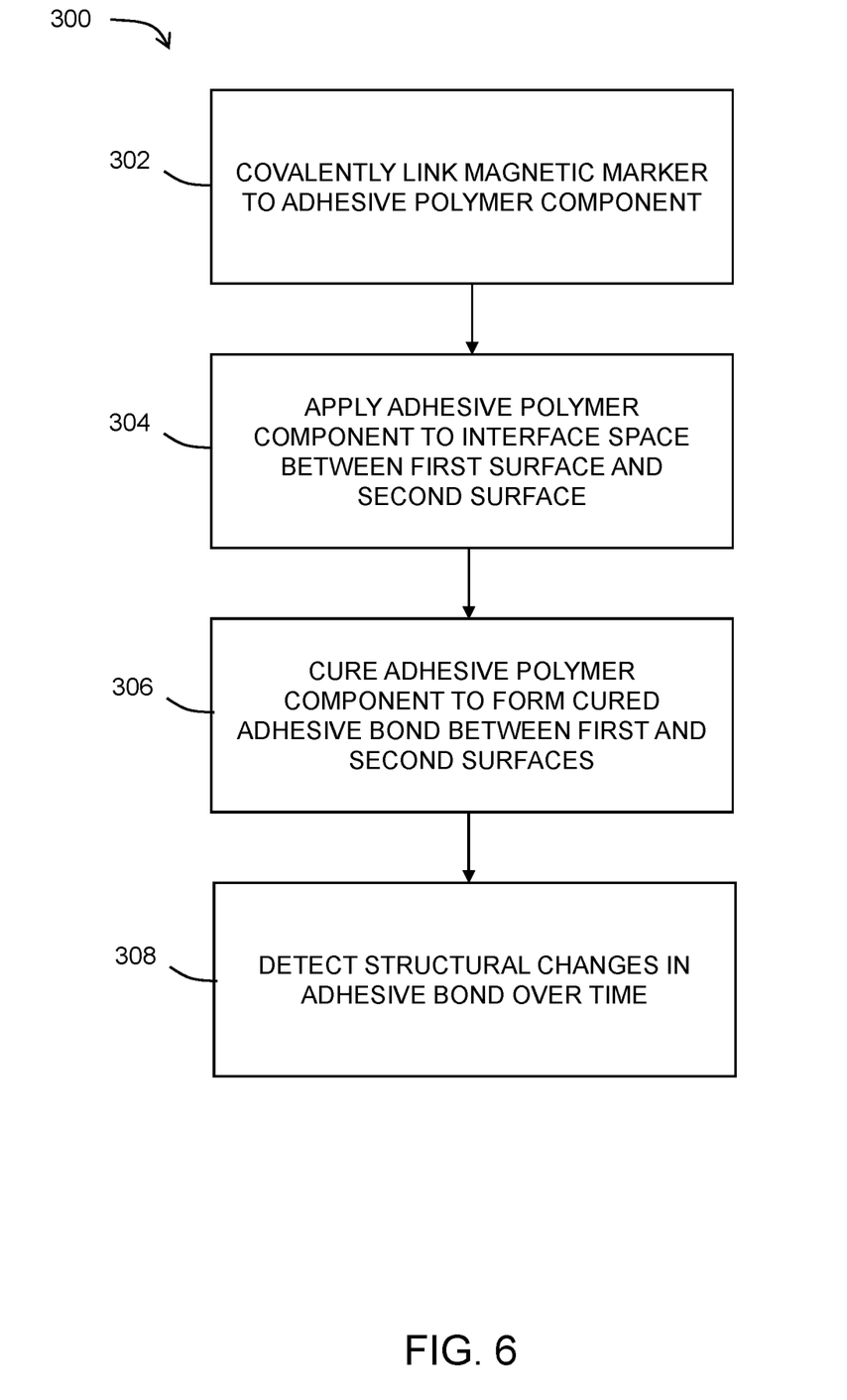
FIG. 6 is a flow diagram depicting steps in an illustrative method for joining parts according to aspects of the present teachings.

This section describes steps of an illustrative method 300 for joining parts; see FIG. 6. Aspects of adhesive system 35 and adhesive bond probing system 150 may be utilized in the method steps described below. Where appropriate, reference may be made to components and systems that may be used in carrying out each step. These references are for illustration, and are not intended to limit the possible ways of carrying out any particular step of the method.

FIG. 6 is a flowchart illustrating steps performed in an illustrative method 300, and may not recite the complete process or all steps of the method. Although various steps of method 300 are described below and depicted in FIG. 6, the steps need not necessarily all be performed, and in some cases may be performed simultaneously or in a different order than the order shown.

At step 302, method 300 includes covalently linking a magnetic marker to an adhesive polymer component. The covalent link may be accomplished by a chemical component of the magnetic marker (e.g., a functional group of the magnetic marker) configured to form a covalent attachment to the adhesive polymer component. The functional group may be, for example, an amine group or an anhydride group. The adhesive polymer component may comprise an epoxy resin.

At step 304, method 300 includes applying the adhesive polymer component to an interface space between a first surface and a second surface. The first and second surfaces may be surfaces of two structures to be joined to form a portion of an aircraft. Applying the adhesive polymer component may include spreading the adhesive polymer component on one or both of the surfaces with a trowel, roller, brush, or other suitable apparatus.

At step 306, method 300 includes curing the adhesive polymer component to form a cured adhesive bond between the first and second surfaces. Curing the adhesive polymer component may include combining a curing agent with the adhesive polymer component. Additionally, or alternatively, curing the adhesive polymer component may include heating the adhesive polymer component to a specific temperature, or irradiating the adhesive polymer component with ultraviolet light.

In some examples, steps 302 and 306 are carried out simultaneously. For example, the adhesive polymer component, the magnetic markers, and the curing agent may be mixed together simultaneously. In other embodiments, step 302 is carried out prior to step 306. For example, the magnetic markers may be mixed in with the adhesive polymer component, and a curing agent is added to the mixture at a later time.

At step 308, method 300 includes detecting structural changes in the adhesive bond over time. For example, method 300 may include detecting cohesive defects, adhesive defects, and/or structural failures in the bonded parts. In some examples, detecting structural changes includes acquiring images of the adhesive bond using magnetic particle imaging, and may further include acquiring images of the bond at different times and correlating the images acquired at different times to identify changes. Correlating images acquired at different times may include performing digital image correlation.

D. Illustrative Method for Monitoring an Adhesive Bond

Figure 7:
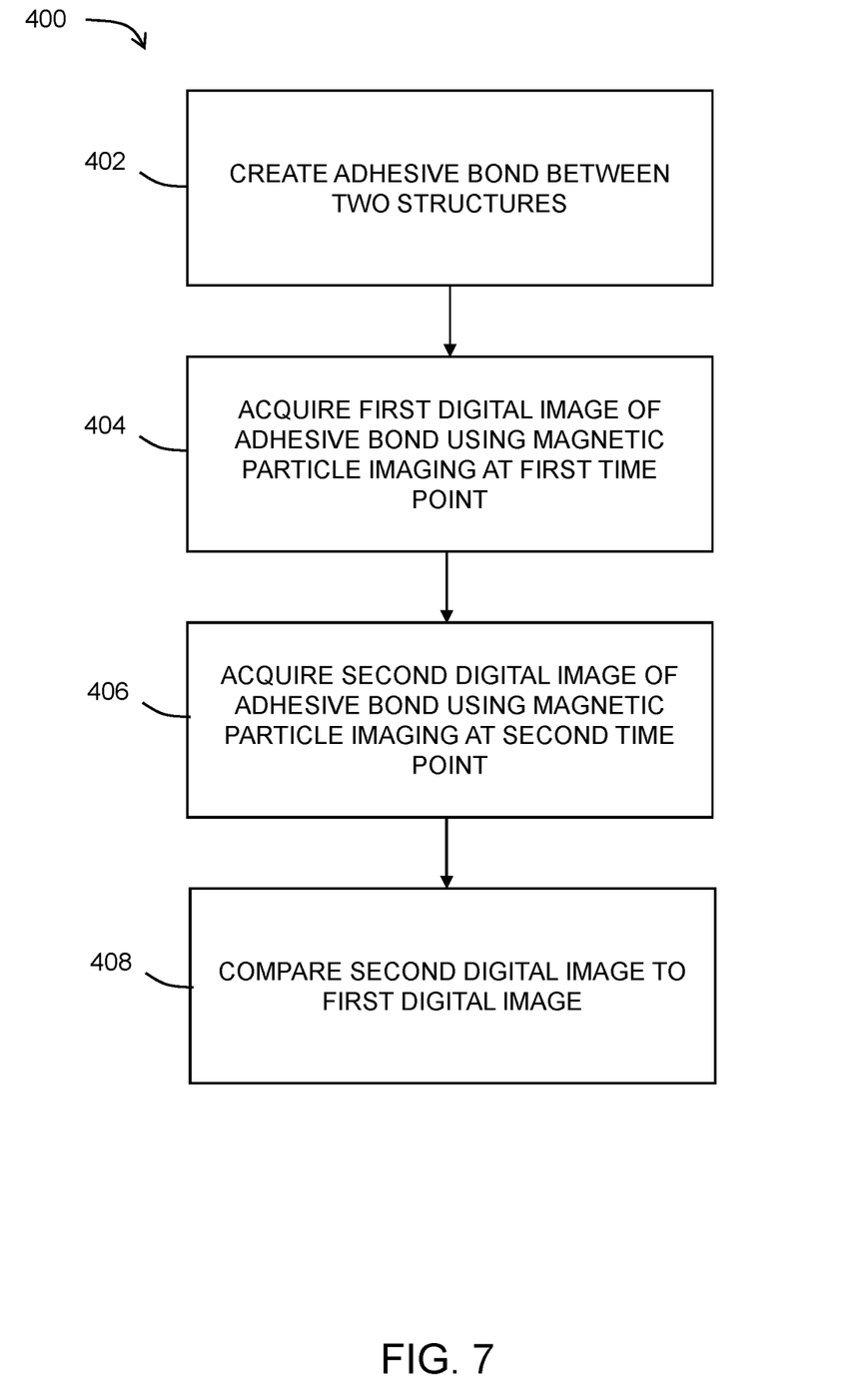
FIG. 7 is a flow diagram depicting steps in an illustrative method of monitoring a characteristic of an adhesive bond over time, according to aspects of the present teachings.

This section describes steps of an illustrative method 400 for monitoring a characteristic of an adhesive bond over time; see FIG. 7. Aspects of adhesive system 35 and adhesive bond probing system 150 may be utilized in the method steps described below. Where appropriate, reference may be made to components and systems that may be used in carrying out each step. These references are for illustration, and are not intended to limit the possible ways of carrying out any particular step of the method.

FIG. 7 is a flowchart illustrating steps performed in an illustrative method, and may not recite the complete process or all steps of the method. Although various steps of method 400 are described below and depicted in FIG. 7, the steps need not necessarily all be performed, and in some cases may be performed simultaneously or in a different order than the order shown.

At step 402, method 400 includes creating an adhesive bond between two structures. The two structures may be formed by composite materials, and may be components of an aircraft. Creating the adhesive bond may include applying to one or both structures an adhesive system incorporating a magnetic marker covalently attached to a polymer component, such as an epoxy resin. The distribution and orientation of the magnetic markers within the bond may be random. Creating the bond includes combining the epoxy resin or other polymer component with a curing agent configured to harden and/or cure the polymer component.

At step 404, method 400 includes acquiring a first digital image of the adhesive bond using magnetic particle imaging at a first time point. At step 406, method 400 includes acquiring a second digital image of the adhesive bond using magnetic particle imaging at a second time point. The images may be acquired in situ. For example, if the adhesive bond is part of an aircraft, the images may be acquired without rendering the aircraft unfit for flight or ordinary maintenance. The digital images may be acquired by a mobile device configured to acquire magnetic particle imaging data. The mobile device is configured for movement throughout an aircraft in order to acquire images of adhesive bonds in various parts of the aircraft. In some examples, the mobile device is configured to be manually held and operated.

At step 408, method 400 includes comparing the second digital image to the first digital image. The comparison may be performed using aspects of digital image correlation, and may be performed using digital image correlation software. Typically, the digital image correlation software receives the first and second digital images as input, and identifies displacement of pixels or voxels from the first image to the second image. Characteristics of the adhesive bond, including the health of the bond and the type and/or severity of any defects present, may be inferred from nonzero or nontrivial displacement. The digital image correlation software may be configured to estimate the type and/or severity of the bond defects likely to be responsible for any detected displacement.

Location-specific indicia may be included in the adhesive bond (e.g., in step 402) in order to provide reference points for acquiring and/or processing the first and second images. The location-specific indicia may be used to ensure that the first and second images have a same orientation when the digital image correlation is performed. In some embodiments, the location-specific indicia include distinctive patterns of magnetic markers. A random distribution and orientation of the magnetic markers within the bond may facilitate automatic formation of these distinctive patterns.

E. Additional Examples and Illustrative Combinations

This section describes additional aspects and features of systems and methods for probing adhesive interfaces, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method for joining parts, comprising: covalently linking a magnetic marker to an adhesive polymer component, applying the adhesive polymer component to an interface space between a first surface and a second surface, and curing the adhesive polymer component to form a cured adhesive bond between the first and second surfaces.

A1. The method of paragraph A0, wherein the adhesive polymer component comprises an epoxy resin.

A2. The method of any one of paragraphs A0 through A1, wherein the curing step includes combining a curing agent with the adhesive polymer component.

A3. The method of any one of paragraphs A0 through A2, wherein the linking and curing steps are carried out simultaneously, A4. The method of any one of paragraphs A0 through A2, wherein the linking step is carried out prior to the curing step.

A5. The method of any one of paragraphs A0 through A4, wherein the magnetic marker is organic.

A6. The method of any one of paragraphs A0 through A4, wherein the magnetic marker is inorganic.

A6a. The method of any one of paragraphs A0 through A4, wherein the magnetic marker is organometallic.

A7. The method of any one of paragraphs A0 through A4, wherein the magnetic marker comprises: (a) $M(TCNE)_x$ where M is selected from the group: Fe, Co, Ni, and Mn porphyrin, or (b) $J[Fe_2O_4]$ where J is selected from the group: Cu, Ni, Mn, Mg.

A7a. The method of any one of paragraphs A0 through A4, wherein the magnetic marker includes a charge-transfer salt comprising:

(a) a plurality of organometallic charge-transfer complexes having the formula $M(TCNE)_x$ where M is selected from the group consisting of Fe, Co, Ni, Mn(porphyrin), and $[Fe(C_5Me_5)_2]$; and x is 1-4; or (b) a spinel structure having the formula $J[Fe_2O_4]$ where J is selected from the group consisting of Cu, Ni, Mn, and Mg.

A8. The method of any one of paragraphs A0 through A7a, further comprising detecting structural changes in the adhesive bond over time.

A9. The method of paragraph A8, wherein the detecting step includes acquiring images of the adhesive bond using magnetic particle imaging.

A10. The method of any one of paragraphs A8 through A9, wherein the detecting step includes correlating digital images of the bond acquired at different times.

A11. The method of any one of paragraphs A0 through A10, wherein the linking step is carried out using an amine or anhydride group.

B0. A method of monitoring a characteristic of an adhesive bond over time, comprising: creating an adhesive bond between two structures, acquiring a first digital image of the adhesive bond using magnetic particle imaging at a first time point, acquiring a second digital image of the adhesive bond using magnetic particle imaging at a second time point, comparing the second digital image to the first digital image.

B1. The method of paragraph B0, wherein the creating step includes applying an adhesive system incorporating a magnetic marker covalently attached to a polymer component.

B2. The method of paragraph B1, wherein the magnetic marker comprises: (a) $M(TCNE)_x$ where M is selected from the group: Fe, Co, Ni, and Mn porphyrin, or (b) $J[Fe_2O_4]$ where J is selected from the group: Cu, Ni, Mn, Mg.

B2a. The method paragraph B1, wherein the magnetic marker includes a charge-transfer salt that comprises:

(a) a plurality of organometallic charge-transfer complexes having the formula $M(TCNE)_x$ where M is selected from the group consisting of Fe, Co, Ni, Mn(porphyrin), and $[Fe(C_5Me_5)_2]$ where x is 1-4; or (b) a spinel structure having the formula $J[Fe_2O_4]$ where J is selected from the group consisting of Cu, Ni, Mn, and Mg.

B2b. The method of any one of paragraphs B1 through B2a, wherein the magnetic marker is positioned randomly within the adhesive bond and has a random spatial orientation.

B3. The method of any one of paragraphs B0 through B2b, wherein the comparing step includes using Digital Image Correlation software.

B4. The method of any one of paragraphs B0 through B3, wherein the adhesive bond includes location-specific indicia.

B5. The method of any one of paragraphs B0 through B4, wherein the acquiring steps are performed in situ.

B6. The method of any one of paragraphs B0 through B5, wherein the acquiring steps are performed with a mobile device configured for movement throughout an aircraft.

B7. The method of paragraph B6, wherein the mobile device is configured to be manually held and operated.

B8. The method of any one of paragraphs B0 through B7, wherein the creating step includes combining an epoxy resin with a curing agent.

C0. An adhesive system, comprising: an epoxy resin comprising polymers having epoxide groups, and a curing agent formulated for combining with the resin, and causing crosslinking between polymers in the resin, and a magnetic marker configured for covalent attachment to the polymer.

C1. The adhesive system of paragraph C0, wherein the magnetic marker is included in the epoxy resin prior to combining the resin with the curing agent.

C2. The adhesive system of paragraph C0, wherein the magnetic marker is provided in the curing agent.

C3. The adhesive system of paragraph C0, wherein the magnetic marker is provided in a separate container and formulated to be combined with the epoxy resin and curing agent at the same time.

C4. The adhesive system of any one of paragraphs C0 through C3, wherein the magnetic marker comprises: (a) $M(TCNE)_x$ where M is selected from the group: Fe, Co, Ni, and Mn porphyrin, or (b) $J[Fe_2O_4]$ where J is selected from the group: Cu, Ni, Mn, Mg.

C4a. The adhesive system of any one of paragraphs C0 through C3, wherein the magnetic marker includes a charge-transfer salt that comprises:

(a) a plurality of organometallic charge-transfer complexes having the formula $M(TCNE)_x$ where M is selected from the group consisting of Fe, Co, Ni, Mn(porphyrin), and $[Fe(C_5Me_5)_2]$ where x is 1-4; or (b) a spinel structure having the formula $J[Fe_2O_4]$ where J is selected from the group consisting of Cu, Ni, Mn, and Mg.

C5. The adhesive system of any one of paragraphs C0 through C4a, wherein the magnetic marker includes an amine or an anhydride group.

Advantages, Features, Benefits

The different embodiments and examples of the composition and method of probing an adhesive interface described herein provide several advantages over known solutions for monitoring the health of an adhesive bond. For example, illustrative embodiments and examples described herein allow an adhesive bond to be inspected in situ, in a non-invasive manner, without the need for an ultrasonic inspection coupling medium such as water or oil.

Additionally, and among other benefits, illustrative embodiments and examples described herein allow monitoring the health of an adhesive bond without embedding within the bond objects large enough to affect the mechanical behavior of the bond.

Additionally, and among other benefits, illustrative embodiments and examples described herein allow inspection of the health of an adhesive bond without testing the bond with heat, stress, a mechanical load, or any other potentially damaging mechanism.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method for joining parts, comprising:
    covalently linking a plurality of magnetic markers to an adhesive polymer component;
    applying the adhesive polymer component to an interface space between a first surface and a second surface;
    curing the adhesive polymer component to form a cured adhesive bond between the first and second surfaces;
    wherein the magnetic markers are randomly distributed and locked in a random spatial orientation within the cured adhesive bond.

2. The method of claim 1, wherein the cured adhesive bond includes location-specific indicia.

3. The method of claim 2, wherein the location-specific indicia includes distinctive random distribution of the magnetic markers.

4. The method of claim 1, wherein the linking step is carried out prior to the curing step.

5. The method of claim 1, wherein the magnetic marker includes a charge-transfer salt comprising:
    (a) a plurality of organometallic charge-transfer complexes having the formula $M(TCNE)_x$ where M is selected from the group consisting of Fe, Co, Ni, Mn(porphyrin), and $[Fe(C_5Me_5)_2]$; and x is 1-4; or
    (b) a spinel structure having the formula $J[Fe_2O_4]$ where J is selected from the group consisting of Cu, Ni, Mn, and Mg.

6. The method of claim 1, further comprising:
    detecting structural changes in the adhesive bond over time.

7. The method of claim 6, wherein the detecting step includes acquiring images of the adhesive bond using magnetic particle imaging.

8. The method of claim 6, wherein the detecting step includes correlating digital images of the bond acquired at different times.

9. A method of monitoring a characteristic of an adhesive bond over time, comprising:
    creating an adhesive bond between two structures, wherein the adhesive bond includes a plurality of randomly distributed magnetic markers covalently attached to a polymer component;
    applying a magnetic field by a mobile device spaced away from the adhesive bond, and configured to induce a change in magnetization of the magnetic markers;
    recording by the mobile device an induced voltage of the magnetic markers in a magnetic field free region;
    acquiring a first digital image of the adhesive bond by the mobile device using magnetic particle imaging at a first time point;
    acquiring a second digital image of the adhesive bond by the mobile device using magnetic particle imaging at a second time point; and
    comparing the second digital image to the first digital image.

10. The method of claim 9, wherein the creating step includes applying an adhesive system incorporating a magnetic marker covalently attached to a polymer component.

11. The method of claim 10, wherein the magnetic marker is about 1 mg/Kg concentration in the adhesive bond.

12. The method of claim 9, wherein the adhesive bond includes location-specific indicia, further comprising:
    rotating one of the first and second digital images until the location-specific indicia in the digital images have the same orientation.

13. The method of claim 9, wherein the acquiring steps are performed in situ.

14. The method of claim 9, wherein the acquiring steps are performed with the mobile device configured for movement throughout an aircraft.

15. The method of claim 14, wherein the mobile device is configured to be manually held and operated.

16. An adhesive system, comprising:
    an epoxy resin comprising polymers having epoxide groups;
    a curing agent formulated for combining with the resin, and causing crosslinking between polymers in the resin; and
    a plurality of magnetic markers configured for covalent attachment to the polymer,
    wherein the magnetic markers are randomly distributed and locked in a random spatial orientation within the adhesive system and form a subset of magnetic markers disposed in a plurality of patterns.

17. The adhesive system of claim 16, wherein the magnetic marker is included in the epoxy resin prior to combining the resin with the curing agent.

18. The adhesive system of claim 16, wherein the magnetic marker is provided in the curing agent.

19. The adhesive system of claim 16, wherein the magnetic marker includes a charge-transfer salt that comprises:
    (a) a plurality of organometallic charge-transfer complexes having the formula $M(TCNE)_x$ where M is selected from the group consisting of Fe, Co, Ni, Mn(porphyrin), and $[Fe(C_5Me_5)_2]$ where x is 1-4; or
    (b) a spinel structure having the formula $J[Fe_2O_4]$ where J is selected from the group consisting of Cu, Ni, Mn, and Mg.

20. The method of claim 12, wherein the rotating step is carried out in three dimensions.

* * * * *